United States Patent

Fukasawa et al.

[11] Patent Number: 5,925,175
[45] Date of Patent: Jul. 20, 1999

[54] DIRECT FILLING INK CAPABLE OF BEING USED FOR A BALLPOINT PEN CONTAINING AN AQUEOUS INK COMPOSITION

[75] Inventors: Teruaki Fukasawa; Kazuhiro Yoshii; Takashi Ohno, all of Isezaki, Japan

[73] Assignee: Kabushiki Kaisha Pilot, Tokyo, Japan

[21] Appl. No.: 08/884,261

[22] Filed: Jun. 27, 1997

[51] Int. Cl.$^6$ ............................................. C09D 11/14
[52] U.S. Cl. ........................... 106/31.36; 106/31.38; 106/31.43; 106/31.58
[58] Field of Search .............. 106/31.36, 31.38, 106/31.43, 31.58

[56] References Cited

U.S. PATENT DOCUMENTS

| | | | |
|---|---|---|---|
| 4,545,818 | 10/1985 | Inoue et al. | 106/31.38 |
| 4,671,691 | 6/1987 | Case et al. | 106/31.38 |
| 4,786,198 | 11/1988 | Zgambo | 106/31.7 |
| 5,013,361 | 5/1991 | Case et al. | 106/31.38 |
| 5,580,374 | 12/1996 | Okumura et al. | 106/31.49 |

FOREIGN PATENT DOCUMENTS

| | | |
|---|---|---|
| 0434179 | 6/1991 | European Pat. Off. . |
| 0685538 | 12/1995 | European Pat. Off. . |
| 3337866 | 10/1983 | Germany . |
| 62101672 | 5/1987 | Japan . |
| 04085375 | 3/1992 | Japan . |

*Primary Examiner*—Helene Klemanski
*Attorney, Agent, or Firm*—Foley & Lardner

[57] ABSTRACT

There is provided an ink capable of being used in a ballpoint pen, the ink comprising: 2 to 10% by weight of a dye, 20 to 30% by weight of a wetting agent, 5 to 10% by weight of urea, 0.2 to 0.4% by weight of cross-linked acrylic acid polymer, 0.05 to 0.2% by weight of xanthan gum, 1.0 to 5.0% by weight of sorbitol, and the balance, water.

12 Claims, No Drawings

DIRECT FILLING INK CAPABLE OF BEING USED FOR A BALLPOINT PEN CONTAINING AN AQUEOUS INK COMPOSITION

BACKGROUND OF THE INVENTION

1. Field of the Invention

The present invention relates to a direct filling ink capable of being used in a ballpoint pen.

2. Description of Related Art

A ballpoint pen where ink is filled directly by an ink tube or a coloring agent is generally known. Typically, inks used in these types of pen have a shear-thinning property. In other words, they have a high viscosity when not being used, and a low viscosity in use due to rolling (shearing force) of the ballpoint pen. Such ballpoint pens tend to have many problems.

For example, one problem is that when the water content in the ink evaporates, the water soluble (dispersible) resin in the ink thickens and/or forms a layer on the pen point due to its considerable high molecular weight, thereby adversely affecting the quality of writing with the pen. The use of a cross-linked acrylic acid polymer ink having a relatively low thickening ratio and forming no layer when water content evaporates solves such problem However, such cross-linked acrylic acid polymer inks have low thixotropy. Thus, desired viscosity is not often obtained by shearing force during a writing operation. This causes bleeding and blurs the writing.

If a pigment is used as a coloring agent, the light resistance and water resistance in the writing tend to be excellent. However, when the water content in the ink evaporates, the pigment can not be dispersed, thereby clogging the ink on the pen point. Thus, it is often difficult to get the pen to write at the onset of each use, or the pen may be incapable of writing at all. And what is worse, in case of the pigment ink, once its dispersion is lost or the pigment has hardened, the pigment generally is difficult to redisperse even if new ink is added. Thus, it is typically difficult to restore. Thus, as of yet, there is no ink suitable for use in a ballpoint pen containing an aqueous ink composition that has sufficient writing ability and resistance to drying.

Due to such problems, ballpoint pens having aqueous ink compositions, must be equipped with a cap to prevent the evaporation of water from the ink. However, a capless type of ballpoint pen capable of commencing a writing operation at a single touch is urgently demanded.

SUMMARY OF THE INVENTION

An object of the present invention, therefore, is to provide an aqueous ink composition having excellent dry-up resistance and excellent writing ability, capable of being used in a ballpoint pen without any bleeding or blur.

In accordance with these and other objectives, there is provided an ink capable of being used in a ballpoint pen, the ink comprising: 2 to 10% by weight of a dye, 20 to 30% by weight of a wetting agent, 5 to 10% by weight of urea, 0.2 to 0.4% by weight of cross-linked acrylic acid polymer, 0.05 to 0.2% by weight of xanthan gum, 1.0 to 5.0% by weight of sorbitol, and the balance, water.

Additional objects and advantages of the invention will be set forth in the following description, and in part will be apparent from the present description, or may be learned by practice of the invention. The objects and advantages of the invention may be realized and obtained by means of the instrumentalities and combinations particularly pointed out in the appended claims.

DETAILED DESCRIPTION OF PREFERRED EMBODIMENT

A suitable ink in accordance with the present invention is a direct filling ink usable for a ballpoint pen and having excellent dry-up resistance, without any significant bleeding and/or blur.

A useful direct filling ink for a ballpoint pen containing an aqueous ink composition according to the present invention, consists essentially of 2 to 10% by weight of a coloring agent, preferably a dye, 20 to 30% by weight of a wetting agent for keeping wet, optionally 5 to 10% by weight of urea, 0.2 to 0.4% by weight of cross-linked acrylic acid polymer, 0.05 to 0.2% by weight of xanthan gum, 1.0 to 5.0% by weight of sorbitol, and the balance being water. Unless otherwise stated, all percentages expressed herein are weight percentages based on the total weight of the ink composition.

One aspect of the present invention is to preferably employ dye as a coloring agent. If a pigment is used, ink stability may be lost by the evaporation of water. Once ink has hardened, the pigment is generally difficult to restore because ink is usually not redispersed even though new ink has been added due to the presence of the pigment. However, if dye is used as a coloring agent and the ink hardens, the dye can generally be restored to its former state when new ink is added due to the redissolution ability of dyes. In other words, even if the water content of a dye-containing ink evaporates to harden the ink on a pen point, the ink is redissolved when new ink is added thereto, and writing can be accomplished successfully Another aspect of the present invention is to use a cross-linked acrylic acid polymer in combination with xanthan gum to add shear-thinning property to the ink. A cross-linked acrylic acid generally does not thicken and form a layer if water content of the ink evaporates. However, cross-linked acrylic acids will tend to have low thixotropy, which may prevent the viscosity of the ink from being lowered to a desired level when writing and from being kept at high levels when not in use. In addition, cross-linked acrylic acids generally have insufficient shear-thinning property.

On the other hand, the xanthan gum has high thixotropy and high shear-thinning property. Therefore, the viscosity of the ink may be adjusted to obtain excellent writing quality without the necessity of dropping the ink from a ballpoint pen tip when applied to a ballpoint pen. However, xanthan gum considerably thickens when water in the ink evaporates, thereby forming a layer on a pen point, and rendering the pen at least somewhat incapable of writing.

According to the present invention, the cross-linked acrylic acid polymer is generally used as a shear-thinning property additive agent to substantially prevent the deterioration of writing ability in the ballpoint pen due to the evaporation of water. The xanthan gum is preferably added to complement shortages in the cross-linked acrylic acid polymer to reduce the likelihood of dropping ink, and to maintain high viscosity of the ink when not in use. This synergism between the cross-linked acrylic acid polymer and the xanthan gum provides an ink with excellent writing capability without incurring significant bleeding, blur or the like when writing. The combination of these two components, inter alia, also provides an ink with excellent dry-up resistance without considerable thickening and/or formation of a layer upon evaporation of water content in the ink. Some thickening when the ink is dropped from the pen point or upon evaporation of the water may occur. A suitable level for the thickening ratio of an ink in accordance with the present invention is preferably between 400 to 1000 mPas at 2.0 sec$^{-1}$, and between 20 to 60 mPas at 400 sec$^{-1}$. The ink of the present composition preferably has a thickening rate of within about 30% in a preferred embodiment.

Yet another aspect of the present invention is the optional addition of urea to the ink. Urea has the ability to inhibit water evaporation as well as the ability to dissolve dye, and as such, serves as a dissolving auxiliary agent to redissolve the dye that has hardened upon water evaporation in the ink. Therefore, a combination of the urea and the dye as a coloring agent contributes remarkably to improving a dry-up resistance and redissolution. However, if a pigment is used as the coloring agent, the urea is preferably only included in an amount that does not significantly affect the stability of the ink. In addition, since a pigment generally cannot easily be redissolved, the inclusion of urea is not critical when pigment is used. However, the inclusion of urea is especially beneficial in inks containing a dye to improve the writing.

Yet another aspect of the present invention is to add sorbitol. The sorbitol is rich in hygroscopic properties and aids in retaining water content in the ink. In addition, its relatively low thickening ratio and drying characteristics contribute largely to maintaining good performance of the ballpoint pen over a long period of time.

A direct filling ink used for a ballpoint pen containing an aqueous ink composition of the present invention in a preferred embodiment, generally comprises a dye, a wetting agent, urea, cross-linked acrylic acid polymer, xanthan gum, sorbitol and water.

The dye used is generally included in an amount from 2 to 10% by weight based on the total weight of the ink composition. If not more than about 2% by weight of ink is included, the writing may in some circumstances become blurred, and in cases where more than about 10% dye by weight is included, the writing ability may begin to deteriorate.

The cross-linked acrylic acid polymer used is preferably included in an amount from 0.2 to 0.4% by weight based on the weight of the ink composition. In case of including less than about 0.2% by weight, the writing ability and the dry-up resistance are adversely affected and produce undesired ink viscosity, and if more than about 0.4% cross-linked acrylic acid polymer by weight is used, the writing ability of the ink may be affected due to the fact the viscosity may not be lowered sufficiently by the shearing force of the ball rolling during a writing operation.

The xanthan gum is preferably used in an amount from 0.05 to 0.2% by weight based on the total weight of the ink. If less than about 0.05% by weight is included, the performance of the ink may be lowered due to undesired viscosity, and if more than about 0.2% by weight is included, a layer may be formed on the pen point, which may deteriorate the writing. Moreover, the use of more than about 0.2% xanthan gum may produce a deposit inside the pen point when the ink dries, thus making the ink unstable.

The wetting agent preferably comprises any compound that functions to keep the ink composition wet. The wetting agent is preferably at least one compound selected from dihydric alcohol, trihydric alcohol and a derivative of an alcohol such as ethylene glycol, propylene glycol, glycerin, diethylene glycol, triethylene glycol, dipropylene glycol, polyglycerin, thiodiglycol, polyethylene glycol, polypropylene glycol, methyl cellosolve, butyl cellosolve, methylcarbitol, or ethylcarbitol. Most preferably, the wetting is at least one compound selected from ethylene glycol, polyethylene glycol and, glycerin. The wetting agent is preferably included in an amount from 20–30% by weight based on the weight of the ink.

If less than about 20% by weight of the wetting agent is included, the dry-up resistance of the ink may be lowered and the ink may harden on the pen point. And if more than about 30% by weight is included, the drying resistance of the ink will still be excellent, however the writing may include blurs and/or bleeding.

The urea, if included, is preferably used in an amount from 5 to 10% by weight based on the total weight of the ink composition. If less than about 5% by weight is included, the hygroscopic property and dye dissolving power are lowered, possibly causing poor dry-up resistance, and if more than 10% by weight is included, the writing ability of the ink may be adversely affected due to the small difference in viscosity when shearing force is applied. In addition, the use of excessive amounts of urea may affect the viscosity when shearing force is not applied due to the possible precipitation of urea crystals after evaporation of some of the water content in the ink. If urea crystals form, they may inhibit ink flow.

The sorbitol is preferably used in an amount from 1.0 to 5.0% by weight based on the weight of the ink. If less than about 10% by weight of sorbitol is included, the hygroscopic property and the dry-up resistance may not be as marked as required, and if more than about 5.0% by weight of sorbitol is included, the thickening ratio in the ink increases upon drying, thereby lowering the dry-up resistance of the ink.

The present ink composition can be prepared using any suitable method known to those skilled in the art. For example, the ink may be prepared by mixing ion exchange water and 20–30 wt. % of a wetting agent (moisture maintaining agent). Then 5–10% by weight of urea, 10–5.0% by weight of sorbitol, 2–10% by weight of dye are added and mixed for one hour at 60° C. A polymerizable acrylic acid polymer or a cross-linked acrylic acid polymer and xanthane gum are added, and the mixture is stirred with a homogenizing stirrer to form a uniform ink.

Other optional ingredients which may be added to the present composition include, 0.2 to 2.0% by weight of rustproof lubricant, 0.5 to 2.0% by weight of a pH regulating agent and 1.0 to 2.0% by weight of a fungusproof agent. Each of these weights being based on the total weight of the ink composition. The rustproof agent, if employed, may comprise one or more compounds selected from the group consisting of a phosphoric acid ester surfactants, phosphoric acid ester type surfactants, benzotriazoles and fatty acid esters. The pH regulating agent, if employed, preferably comprises triethanolamine. The fungusproof agent may comprise any compound known to function in preventing or reducing fungus as known to those skilled in the art, such as 1,2-benzoisothiazoline-3-one (PROXEL XL-2, Zeneca, Ltd.).

The present invention will be described by the following examples.

EXAMPLE 1

| Direct black 154 | 7.5% | by weight |
| ethylene glycol | 20.0% | by weight |

-continued

| | | |
|---|---|---|
| urea | 5.0% | by weight |
| sorbitol | 1.0% | by weight |
| rustproof lubricant | 0.5% | by weight |
| pH regulating agent | 0.5% | by weight |
| fungusproof agent | 1.0% | by weight |
| cross-linked acrylic acid polymer | 0.25% | by weight |
| xanthan gum | 0.15% | by weight |
| ion exchange water | | rest |

Ion exchange water was mixed with ethylene glycol followed by adding urea, sorbitol, dye, rustproof lubricant, a pH regulating agent, and a fungusproof agent to mix by stirring, and followed by adding cross-linked acrylic acid polymer and xanthan gum to mix, to prepare, ink.

EXAMPLES 2 to 10

Ink was prepared as Example 1 but the proportion of each composition and dye are changed as shown in Table 1.

Ink performance is shown in Table 1.

TABLE 1

| | Examples | | | | | | | | | |
|---|---|---|---|---|---|---|---|---|---|---|
| | 1 | 2 | 3 | 4 | 5 | 6 | 7 | 8 | 9 | 10 |
| Direct Black 154 | 7.5 | 7.5 | 7.5 | 7.5 | 7.5 | 7.5 | 7.5 | 7.5 | — | 10.0 |
| Acid Blue 9 | — | — | — | — | — | — | — | — | 2.0 | — |
| ethylene glycol | 20.0 | 20.0 | 20.0 | 20.0 | 30.0 | 30.0 | 20.0 | 20.0 | 20.0 | 20.0 |
| urea | 5.0 | 10.0 | 10.0 | 5.0 | 5.0 | 5.0 | 5.0 | 5.0 | 5.0 | 5.0 |
| sorbitol | 1.0 | 5.0 | 1.0 | 5.0 | 5.0 | 5.0 | 5.0 | 5.0 | 5.0 | 5.0 |
| rustproof lubricant | 0.5 | 0.5 | 0.5 | 0.5 | 0.5 | 0.5 | 0.5 | 0.5 | 0.5 | 0.5 |
| pH regulating agent | 0.5 | 0.5 | 0.5 | 0.5 | 0.5 | 0.5 | 0.5 | 0.5 | 0.5 | 0.5 |
| fungusproof agent | 1.0 | 1.0 | 1.0 | 1.0 | 1.0 | 1.0 | 1.0 | 1.0 | 1.0 | 1.0 |
| cross-linked acrylic acid polymer | 0.25 | 0.25 | 0.25 | 0.25 | 0.25 | 0.40 | 0.40 | 0.20 | 0.25 | 0.25 |
| xanthan gum | 0.15 | 0.15 | 0.15 | 0.15 | 0.15 | 0.05 | 0.05 | 0.20 | 0.15 | 0.15 |
| ion exchange water | rest | rest | rest | rest | rest | rest | rest | rest | rest | rest |
| writing ability | ⊚ | ⊚ | ⊚ | ⊚ | ⊚ | ○ | ○ | ○ | ⊚ | ⊚ |
| dry-up resistance ability | ○ | ⊚ | ⊚ | ⊚ | ⊚ | ⊚ | ⊚ | ○ | ⊚ | ○ |
| ink stability | ○ | ⊚ | ⊚ | ⊚ | ⊚ | ⊚ | ⊚ | ⊚ | ⊚ | ○ |

Writing performance
⊚—Especially excellent writing without any bleeding or blur
○—Available to practical use
Δ—Somewhat poor
X—Especially poor
Dry-up resistance ability: Evaluated by writing a line with a ballpoint pen, which was left sideways without a cap at 50° C. under 30% RH for more than 3 months and an ink receiving tube (inner core) thereof at room temperature
⊚—Capable of beginning writing within 3 cm without a cut line, blur or the like
○—Capable of beginning writing within 3 to 5 cm
Δ—Capable of beginning writing within 5 to 10 cm
X—Incapable of beginning writing within 10 cm
Ink stability: Evaluated by a status after leaving the ballpoint pen sideways without a cap at 50° C. under 0% RH
⊚—Stable for 3 months or longer (No deposit in ink not less than 3 months and a thickening rate is within 30%)
○—Stable for 2 to 3 months
Δ—Stable for 1 to 2 months
X—Out of the above conditions within 1 month As apparent from the Examples, according to the present invention, dye is preferably used as a coloring material, a wetting agent is beneficial to include for maintaining the moisture content of the ink, urea and sorbitol are beneficially used to obtain an excellent dry-up resistance and, cross-linked acrylic acid polymer is beneficially used in combination with xanthan gum to obtain both excellent writing ability and ink stability when drying up.

COMPARATIVE EXAMPLES 1 to 19

Ink was prepared as Example 1 but ink compositions as shown in Table 2.

Performance is shown in Table 2.

TABLE 2

| | Comparative Examples | | | | | | | | | | | | | | | | | | |
|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 |
| Direct Black 154 | 13.0 | — | — | 7.5 | 7.5 | 7.5 | 7.5 | 7.5 | 7.5 | 7.5 | 7.5 | 7.5 | 7.5 | 1.5 | 4.0 | — | 7.5 | 7.5 | 7.5 |
| carbon black | — | 4.0 | 4.0 | — | — | — | — | — | — | — | — | — | — | — | 1.5 | 4.0 | — | — | — |
| pigment disperse agent | — | 1.0 | 1.0 | — | — | — | — | — | — | — | — | — | — | — | 0.5 | 1.0 | — | — | — |
| ethylene glycol | 30.0 | 30.0 | 30.0 | 10.0 | 40.0 | 20.0 | 20.0 | 20.0 | 20.0 | 20.0 | 20.0 | 20.0 | 20.0 | 20.0 | 20.0 | 20.0 | 20.0 | 20.0 | 20.0 |
| urea | 10.0 | 10.0 | — | 10.0 | 5.0 | 3.0 | 10.0 | 15.0 | 5.0 | 5.0 | 5.0 | 5.0 | 5.0 | 5.0 | 5.0 | 5.0 | 5.0 | 5.0 | 5.0 |
| sorbitol | 4.0 | 5.0 | 5.0 | 5.0 | 5.0 | 5.0 | 0.05 | 1.0 | 8.0 | 5.0 | 5.0 | 5.0 | 5.0 | 5.0 | 5.0 | 5.0 | 5.0 | 5.0 | 5.0 |
| rustproof lubricant | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 |

TABLE 2-continued

| | Comparative Examples | | | | | | | | | | | | | | | | | | |
|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 |
| pH regulating agent | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 |
| fungusproof agent | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 |
| cross-linked acrylic acid polymer | 0.20 | 0.25 | 0.25 | 0.20 | 0.25 | 0.25 | 0.20 | 0.25 | 0.20 | 0.50 | 0.20 | 0.10 | 0.50 | 0.25 | — | — | 0.1 | 0.1 | 0.50 |
| xanthan gum | 0.10 | 0.15 | 0.15 | 0.05 | 0.20 | 0.15 | 0.20 | 0.15 | 0.20 | 0.03 | 0.30 | 0.20 | 0.30 | 0.15 | 0.5 | 0.5 | 0.3 | 0.03 | — |
| ion exchange water | rest | rest | rest | rest | rest | rest | rest | rest | rest | rest | rest | rest | rest | rest | rest | rest | rest | rest | rest |
| writing ability | Δ | Δ | Δ | X | X | Δ | Δ | X | X | X | Δ | Δ | X | X | Δ | X | X | X | X |
| dry-up resistance ability | X | X | X | X | ○ | X | X | Δ | Δ | X | X | X | X | Δ | X | X | Δ | ○ | X |
| ink stability | X | X | Δ | Δ | Δ | X | Δ | X | X | Δ | X | X | X | ○ | X | X | X | Δ | Δ |

Comparative Example 1 shows an example of an increased concentration of dye, and Comparative Example 14 shows an example of a decreased concentration of dye. The increased concentration of dye exhibits weak pseudoplastic ability, thereby desirable ink viscosity is difficult to obtain. The writing ability is adversely affected, ink stability is poor when drying up, and dry-up resistance ability is reduced. In addition, the reduced concentration of dye exhibits excellent ink stability, but has reduced writing ability at the beginning of a writing operation due to the properties of the resin when drying up.

Comparative Examples 2, 3, 15 and 16 show examples of using pigment instead of dye as coloring material. The pigment ink is not completely restorable and has reduced ink stability when drying up. In addition, the use of pigment may have a wearing effect on the ball portion of a ballpoint pen, thereby potentially shortening the writing lifetime of the pen.

Comparative Example 5 shows an example that employs an elevated amount of the wetting agent, and Comparative Example 4 shows an example of a reduced amount of the wetting agent. The example employing the elevated quantity thereof exhibits an excellent dry-up resistance ability, but has slightly poorer writing ability with some blurs and bleeding In addition, the ink has reduced stability due to abnormal thickening in the ink after drying. On the other hand, the reduced amount thereof exhibits an absence of ink lubricity, causing some blurs or cuts in the writing, and also exhibits a low dry-up resistance ability due to the a reduced amount of hygroscopic wetting agents.

Comparative Example 8 shows an example of an increased amount of the urea, and Comparative Example 6 shows an example of a reduced amount of the urea. The increased additive amount thereof exhibits a poorer writing ability due to a small difference between the viscosity of the ink when shearing force is applied and the viscosity when shearing force is not applied. In addition, crystals may be precipitated on the pen point when drying up. On the other hand, the reduced additive amount thereof exhibits reduced dry-up resistance ability caused by the lower amount of hygroscopic properties and dye dissolving power.

Comparative Example 9 shows an example of an increased additive amount of the sorbitol, and Comparative Example 7 shows an example of a reduced amount of the sorbitol. The increased amount thereof exhibits weak pseudoplastic ability, thereby writing ability is adversely affected. In addition, crystals may precipitate when water content is evaporates because of solubility. On the other hand, the reduced additive amount thereof exhibits a reduction in the ink lubricity, resulting in a reduction in dry-up resistance, and also exhibits a poorer writing ability due to a reduction in the viscosity of the ink.

Comparative Example 10 shows an example of an increased amount of the cross-linked acrylic acid polymer. Comparative Example 11 shows an example of an increased amount of the xanthan gum. The large additive amount of the cross-linked acrylic acid polymer affects the writing ability because the viscosity is not sufficiently lowered due to shearing force of the ball rolling when writing In addition, writing ability at the beginning of a writing operation is also lowered due to the same reason. If the amount of the xanthan gum is too high, not only is a layer easily formed on the pen point, resulting in poor writing at beginning, but also a deposit is produced inside the pen point when drying up, resulting unstable ink.

Comparative Example 12 shows an example of a reduced additive amount of the cross-linked acrylic acid polymer. Comparative Example 10 shows an example of a reduced amount of the xanthan gum In the Comparative Example 12, even if the xanthan gum is added thereto at a maximum amount in view of a layer forming ability of ink, the desired ink viscosity is difficult to obtain, thus adversely effecting the writing ability. In addition, the water retention power of the cross-linked acrylic acid polymer is lowered, resulting in a reduction in the dry-up resistance ability. The reduced amount of the xanthan gum exhibits lower performance because the desired viscosity is difficult to set.

Comparative Example 18 shows an example of a reduced amount of both the cross-linked acrylic acid polymer and the xanthan gum In this case, ink is easily dropped from the pen, high viscosity when the ink is not in use if difficult to maintain, and writing quality is adversely affected.

Comparative Example 19 shows an example of adding only the cross-linked acrylic acid polymer not including the xanthan gum as a viscosity adjusting agent. Without the xanthan gum, adequate shearing decrease effect is difficult to obtain. To prevent blurs, cuts in the writing or drop of the ink, it is necessary to add additional amounts of the cross-linked acrylic acid polymer, thus resulting in deterioration of the dry-up resistance of the ink. Therefore, the use of both xanthan gum and the cross-linked acrylic acid polymer is preferential.

Ink of the present invention has excellent dry-up resistance ability and writing ability without substantial bleeding and/or blur and is most suitable use in a ballpoint pen application.

Additional advantages, features and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An ink capable of being used in a ballpoint pen, said ink comprising:

2 to 10% by weight of a dye;

20 to 30% by weight of a wetting agent;

5 to 10% by weight of urea;

0.2 to 0.4% by weight of cross-linked acrylic acid polymer;

0.05 to 0.2% by weight of xanthan gum;

1.0 to 5.0% by weight of sorbitol; and balance water;

wherein the cross-linked acrylic acid polymer and the xanthan gum provide shear-thinning property to the ink, and wherein the ink has a relatively low thickening ratio and forms no ink layer when the water evaporates from the ink.

2. An ink according to claim 1, further comprising 0.2 to 2.0% by weight of a rustproof lubricant.

3. An ink according to claim 1, further comprising 0.5 to 2.0% by weight of a pH regulating agent.

4. An ink according to claim 1, further comprising 1.0 to 2.0% by weight of a fungus-proof agent.

5. An ink according to claim 1, wherein the wetting agent comprises at least one selected from the group consisting of dihydric alcohol, trihydric alcohol and derivatives of dihydric alcohols and trihydric alcohols.

6. An ink according to claim 1, wherein the wetting agent comprises at least one selected from the group consisting of ethylene glycol, polyethylene glycol and glycerin.

7. An ink according to claim 2, wherein the rustproof agent comprises at least one selected from the group consisting of phosphoric acid ester surfactants, benzotriazoles and fatty acid esters.

8. An ink according to claim 3, wherein the pH regulating agent is triethanolamine.

9. An ink according to claim 1, wherein the thickening ratio of said ink is between 400 to 1000 mPas at 2.0 $sec^{-1}$.

10. An ink according to claim 1, wherein the thickening ratio of said ink is between 20 to 60 mPas at 400 $sec^{-1}$.

11. An ink according to claim 1, wherein when said ink is exposed to 50° C. under 30% relative humidity for 3 months and then loaded in an ink receiving tube at room temperature, said ink is capable of beginning writing within 3 cm without a cut line or blur.

12. An ink according to claim 1, wherein after said ink is exposed to 50° C. under 0% Relative Humidity for a period of 3 months, there is substantially no deposit in said ink and the thickening rate of said ink is within 30%.

* * * * *